Jan. 24, 1956   A. H. B. WALKER ET AL   2,732,505
ELECTRIC CONTROL APPARATUS
Filed Aug. 26, 1953
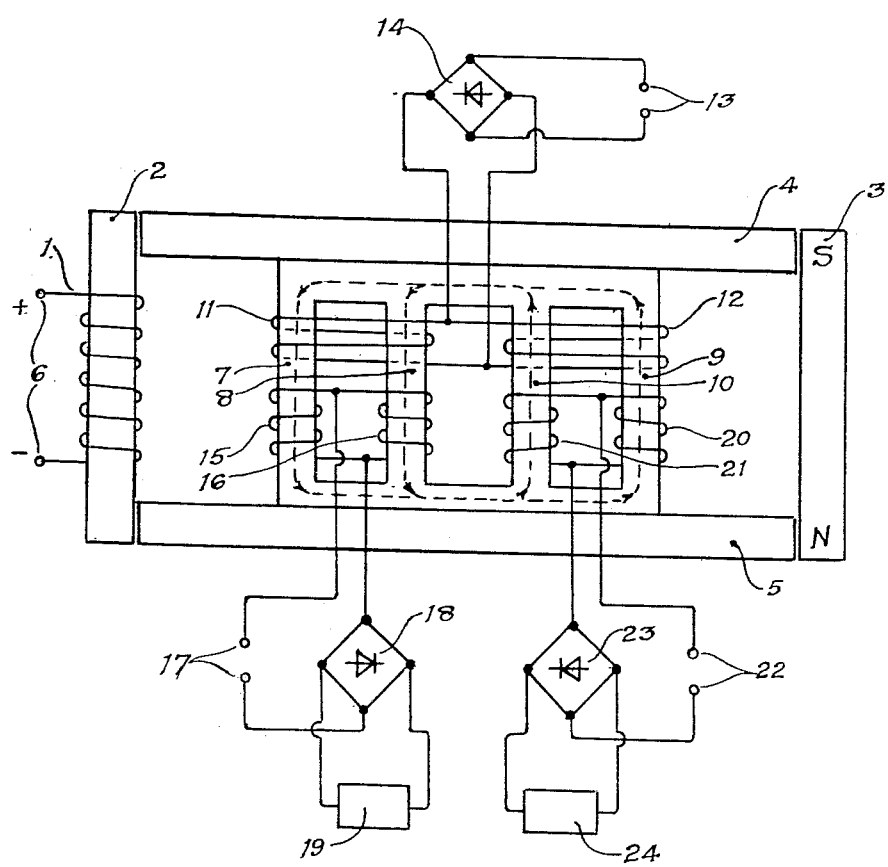
INVENTORS
ALEC HERVEY BENNETT WALKER,
KENNETH GORDON KING,
BY
Robert B Larson
ATTORNEY

United States Patent Office 2,732,505
Patented Jan. 24, 1956

2,732,505

ELECTRIC CONTROL APPARATUS

Alec Hervey Bennett Walker and Kenneth G. King, London, England, assignors to Westinghouse Brake and Signal Company Limited, London, England Application August 26, 1953, Serial No. 376,546

Claims priority, application Great Britain September 15, 1952

5 Claims. (Cl. 307—11)

The present invention relates to electric control apparatus of the kind in which a substantially constant magneto motive force is opposed to the magneto motive force of a control winding to provide a resultant or error flux effecting the desired control.

In one known form of electric control apparatus of this kind the error flux resulting from an unbalance between the magneto motive forces is caused to flow through the two limbs of a closed magnetic circuit in one direction or the other depending on whether that due to the control winding produced by the flow of a direct current therethrough is greater or less than that due to a permanent magnet which, in this instance, provides the substantially constant magneto motive force. On each of the two limbs is mounted a detector winding, these windings being oppositely wound in such a way that an alternating flux flowing in phase in the two limbs induces equal antiphase alternating voltage across the windings. These two windings are connected in parallel, the two together being connected in series with an alternating current source and a control rectifier across the unidirectional terminals of which is developed the potential for controlling the operation of a control or indication device.

The two limbs of the closed magnetic circuit thus constitute a saturable reactor and the combined reactances of the detector windings mounted thereon will vary between a maximum value when the fluxes due to the magneto motive forces of the control winding and the permanent magnet are balanced, to a value determined by the magnitude of the error flux irrespective however of the direction of flow of this flux.

An arrangement of this kind has the disadvantage that it gives no indication of the sense of the error flux and it is, therefore, necessary, when using the arrangement for a constant potential system, for instance, to ensure that the error is always in one direction.

Furthermore in this known arrangement the maximum reactance of the detector windings when the fluxes due to the two magneto motive forces are balanced is never infinite and, under these conditions a small potential is produced at the unidirectional voltage terminals of the control rectifier which is difficult to neutralise over a range of voltage and frequency of the alternating current source.

In order to overcome these disadvantages in accordance with the present invention an electric control apparatus is provided having a closed magnetic circuit in which a substantially constant magneto motive force is opposed to the magneto motive force of a control winding to provide a resultant error flux, the closed magnetic circuit comprising a first limb having a first detector winding thereon and a second limb having a second detector winding thereon, the error flux being caused to flow through said limbs in one direction or the other depending upon whether the flux due to the magneto motive force of the control winding is greater or less than that due to the substantially constant magneto-motive force, characterised in that the error flux causes a reduction in the total flux flowing in one limb and an increase in the total flux flowing in the other limb, according to the direction of flow of the error flux, so as to affect the magnitude of each of two separate alternating currents one of which flows in said first detector winding and the other of which flows in said second detector winding, said separate alternating currents being utilised to control the operation of control or indication apparatus.

Preferably each limb comprises a pair of arms with one or more bias windings mounted thereon and arranged to produce a bias flux which flows in one direction in one pair and in the other direction in the other pair of arms, whereby the flow of error flux assists the bias flux in one pair and opposes the bias flux in the other pair of arms.

Advantageously each arm is provided with a detector winding, the detector windings on each pair of arms being oppositely connected in such a way that an alternating flux in the arms created by the flow of an alternating current superimposed on the direct current in the control winding induces equal antiphase alternating voltages across the detector windings associated with each pair of arms.

The drawing is a diagrammatic circuit arrangement of a control apparatus according to the present invention.

In one form of the control device according to the present invention and illustrated by way of example in the drawing, the control winding 1 is mounted on a member 2 which with a permanent magnet 3 and two yokes 4 and 5 forms an outer closed magnetic circuit, a unidirectional source of potential (not shown) being connected across the terminals 6 of the control winding to produce in the magnetic circuit a magneto motive force which opposes that of the permanent magnet. An inner closed magnetic circuit arranged as a central core of the outer closed magnetic circuit comprises a first limb formed by a first pair of parallel arms 7 and 8 and a second limb formed by a second pair of parallel arms 9 and 10, the arrangement being such that in the event of an unbalance between the flux due to the magnetomotive forces of the control winding and that due to the permanent magnet a resultant or error flux flows in the same direction through the arms, the direction of flow depending on whether the flux due to the magnetomotive force of the control winding is greater or less than that due to the permanent magnet.

Bias windings 11 and 12 are mounted on the first and second pairs of arms respectively and a suitable source of alternating current connected to terminals 13 is arranged to supply through a bias rectifier 14 direct current to the two bias windings which are connected in parallel and arranged in such a way that bias flux of equal magnitude flows in opposite directions in each pair of arms and circulates in the inner closed magnetic circuit in a manner illustrated by the arrows and dotted lines in the drawing.

On each limb is mounted a detector winding comprising two coils, one on each arm of the limb. The two detector coils 15 and 16 associated with the first pair of arms are oppositely connected in parallel with each other and in series with a first alternating current source which is connected to terminals 17 and the alternating current terminals of a first control rectifier 18 which provides the direct current potential for controlling the operation of a first control or indication device 19. Similarly the coils 20 and 21 of the detector winding associated with the second pair of arms are oppositely connected in parallel with each other and in series with a second alternating current source which is connected to terminals 22 and the alternating current terminals of a second control rectifier 23 which provides the direct current potential for controlling the operation of a second control or indication device 24.

Accordingly with zero error flux in the two pairs of arms when the flux due to the magnetomotive forces of the control winding 1 and permanent magnet 3 are balanced the only unidirectional flux in the arms will be that due to the bias windings 11 and 12, and the reactance of the detector windings associated with each pair of arms will be the same.

In the event of an increase in the voltage across the control winding 1 an error flux will flow, for instance, in such a direction as to assist the flux produced by the bias winding 11 in the first pair of arms 7, 8 and oppose the flux produced by the bias winding 12 in the second pair of arms 9, 10. Hence the reactance of the parallel connected detector winding coils 15 and 16 will be decreased and that of the parallel connected detector winding coils 20 and 21 will be correspondingly increased whereby the potentials developed across the unidirectional voltage terminals of the first control rectifier 18 and the second control rectifier 23 will be increased and decreased respectively by equal amounts determined by the magnitude of the error flux. On the other hand in the event of a decrease in the voltage across the control winding 1, an error flux will flow in the other direction through the arms to oppose the flux produced by the bias winding 11 in the first pair of arms 7, 8 and assist the flux produced by the bias winding 12 in the second pair of arms 9, 10. Hence the reactance of the parallel connected detector winding coils 15 and 16 will be increased and that of the parallel connected detector winding coils 20 and 21 will be correspondingly decreased whereby the potentials developed across the unidirectional terminals of the first control rectifier 18 and the sceond control rectifier 23 will be decreased and increased respectively by equal amounts determined by the magnitude of the error flux.

The detector winding coils on each pair of arms are oppositely connected in parallel so that an alternating flux created by an alternating current or ripple superimposed on the direct current in the control winding 1 and flowing in phase through both of the limbs of the inner magnetic circuit will induce across the parallel connections of the detector winding coils 15 and 16 and the first pair of arms and across the parallel connections of the detector winding coils 20 and 21 on the second pair of arms two alternating voltages which are 180° out of phase so as to have no effect on the associated control or indication devices. With this arrangement, due to the flow of alternating current from the first alternating current source through the detector winding coils 15 and 16, alternating flux induced in the first pair of arms 7 and 8 will flow in these arms in opposite directions at any instant so as to circulate in effect only round these arms, while, due to the flow of alternating current from the second alternating current source through the detector winding coils 20 and 21, the alternating flux induced in the second pair of arms 9 and 10 will similarly flow in these arms in opposite directions at any instant so as to circulate in effect only round these arms, interaction between the alternating fluxes in the two pairs of arms being thus avoided.

It is evident that the invention is not limited to the particular form of control apparatus above described and illustrated in the drawing, and that a number of modifications may be made to meet particular conditions or requirements, for instance, the bias windings if electrically identical, may be connected in series, or each may be composed of two coils, one on each arm of its associated limb, or, in order to dispense with the bias windings altogether, the bias flux may be produced by a direct current superimposed on the alternating current in the detector windings. Also, the coils of the detector windings on each pair of arms may be oppositely connected in series and the detector windings on each limb and the associated control rectifiers may be connected across a common alternating current source whereby any variations in the voltage or frequency of this source cannot affect the balance of the two limbs when zero error flux is flowing therethrough.

It is furthermore evident that the two control devices 19 and 24 may be replaced by the two windings of a single differentially operted control or indicator device such as a magnetic amplifier or a double acting relay.

Whilst in the specific embodiment described herein the substantially constant magneto-motive force is provided by a permanent magnet, it is to be understood that it may alternatively be provided by a correspondingly disposed limb of the core structure composed of a high permeability material, such as that marketed under the registered trade mark "Mumetal," having an excitation winding thereon energised with direct current of a magnitude which causes the limb to be magnetically saturated.

Having thus described our invention, what we claim is:

1. Electric control apparatus comprising, in combination, a magnetic core structure havin a closed magnetic circuit comprising a first limb and a second limb, a first detector winding on said first limb, a second detector winding on said second limb, means providing a substantially constant magneto-motive force across said magnetic circuit, a member of said core structure having a control winding thereon, means for energizing said control winding with direct current to produce in said magnetic circuit a flux opposing the flux due to said substantially constant magneto-motive force and having a normal magnitude such that there is no resultant error flux, variations in said direct current in said control winding causing deviation from said normal magnitude and thus causing an error flux to flow in said magnetic circuit, bias means causing a uni-directional flux to flow round said magnetic circuit, the arrangement being such that the error flux causes a decrease in the flux flowing in one of said limbs, means causing an alternating current to flow in said first detector winding, means causing a separate alternating current to flow in said second detector winding, and control apparatus operated by each of said alternating currents.

2. Electric control apparatus comprising, in combination, a magnetic core structure having a closed magnetic circuit comprising a first pair of arms and a second pair of arms, a first detector winding on said first pair of arms and composed of a pair of coils one on each of said first pair of arms, a second detector winding on said second pair of arms and composed of a pair of coils one on each of said second pair of arms, the detector winding being so arranged that alternating voltages induced in the two coils of each pair by alternating flux flowing in said arms are equal and opposite, a bias winding embracing said pair of arms to produce therein a unidirectional flux flowing round said magnetic circuit, means providing a substantially constant magneto-motive force across said magnetic circuit, means including a control winding providing a flux in said magnetic circuit opposing the flux due to said substantially constant magneto-motive force, said control winding being normally energized with direct current of such a magnitude that there is no resultant error flux, whereby variations in said direct current upsets the balance between said opposing fluxes and causes an error flux to flow in said arms causing an increase in flux in one pair of arms and a decrease in flux in the other pair of arms, means for energizing said detector windings separately with alternating current, means for rectifying the alternating current in said detector windings, and control apparatus controlled by each of said rectified alternating currents.

3. Electric control apparatus comprising, in combination, a magnetic core structure having a closed magnetic circuit composed of two yoke members and a first pair of arms and a second pair of arms extending between said yoke members, a permanent magnet bridging said yoke members, a magnetizable limb also bridging said yoke members and having a control winding mounted thereon, the arrangement being such that when said control winding is energized with direct current of a predetermined magnitude the flux induced in said limb is equal and opposite to the flux due to said permanent magnet and that variations of said direct current cause an error flux to flow in said arms, a bias winding embracing said pair of arms, means for energizing said bias winding with direct current, said bias winding being so wound as to cause a bias flux to flow round said magnetic circuit the flow being in one direction in one of said pairs of arms and in the opposite direction in the other of said pair of arms, a first detector winding composed of two coils oppositely wound one on each of said first pair of arms, a second detector winding composed of two coils oppositely wound one on each of said second pair of arms, means for energizing each of said detector windings with separate alternating currents, means for rectifying each of said alternating currents, and control apparatus controlled by each of said rectified alternating currents.

4. Electric control apparatus comprising, in combination, a magnetic core structure having a closed magnetic circuit comprising a first limb and a second limb, a first detector winding on said first limb and a second detector winding on said second limb, means providing a substantially constant magneto-motive force across said magnetic circuit, a member of said core structure having a control winding thereon, means for energizing said control winding with direct current to produce across said magnetic circuit a flux opposing the flux due to said substantially constant magneto-motive force and having a normal magnitude equal thereto, variations in said direct current in said control winding causing deviation from said normal magnitude and thus causing an error flux to flow in said magnetic circuit, bias means causing a unidirectional flux to flow round said magnetic circuit, the arrangement being such that the error flux causes a decrease in the flux flowing in one of said limbs and an increase in the flux flowing in the other of said limbs, circuit means connecting said first detector winding in parallel with said second detector winding to a source of alternating current and apparatus controlled jointly by current flowing in said first detector winding and by current flowing in said second detector winding.

5. Electric control apparatus comprising, in combination, a magnetic core structure having a closed magnetic circuit comprising a first pair of arms and a second pair of arms, a first detector winding on said first pair of arms and composed of a pair of coils one on each of said first pair of arms, a second detector winding on said second pair of arms and composed of a pair of coils one on each of said second pair of arms, the detector winding being so arranged that alternating voltages induced in the two coils of each pair by alternating flux flowing in said arms are equal and opposite, a bias winding embracing said pair of arms to produce therein a unidirectional flux flowing round said magnetic circuit, means providing a substantially constant magnetomotive force across said magnetic circuit, means including a control winding providing an opposing magnetomotive force across said magnetic circuit, said control winding being normally energized with direct current of such a magnitude that the opposing fluxes are equal and opposite, whereby variations in said direct current upsets the balance of said opposing fluxes and causes an error flux to flow in said arms causing an increase in flux in one pair of arms and a decrease in flux in the other pair of arms, means for energizing said detector windings in parallel with alternating currents from a common source, means for rectifying said alternating currents flowing in said detector windings and control apparatus operated by the rectified currents.

References Cited in the file of this patent

UNITED STATES PATENTS

| | | |
|---|---|---|
| 2,306,998 | Claesson | Dec. 29, 1942 |
| 2,509,864 | Hedstrom | May 30, 1950 |
| 2,560,284 | Grandstaff | July 10, 1951 |